Feb. 25, 1958 L. H. LAMOURIA 2,824,665
OBJECT ALINING APPARATUS
Filed Sept. 28, 1955 2 Sheets-Sheet 1

INVENTOR.
LLOYD H. LAMOURIA
BY
*Lippincott & Smith*
ATTORNEYS

United States Patent Office 2,824,665
Patented Feb. 25, 1958

2,824,665

OBJECT ALINING APPARATUS

Lloyd H. Lamouria, Davis, Calif., assignor to The Regents of The University of California, Berkeley, Calif., a corporation of California Application September 28, 1955, Serial No. 537,196

16 Claims. (Cl. 221—179)

This invention is directed to an alining mechanism particularly useful in the fruit industry for supplying fruits of various sorts and types to a conveyor system. The conveyor system may be of any sort and, illustratively, may be that which conveys the fruit for processing, such as halving, pitting and the like, or the conveyor system may be for other and various uses.

The invention is useful in alining any sort of articles having a density which is generally close to that of the liquid used as a circulating and conveying medium. For reasons of providing a specific form of explanation of the invention reference herein will be made to its use to aline fruit of the drupaceous variety, such as apricots, peaches, and plums, to name some of the better known varieties. However, the principles herein to be set forth apply readily for alining other media, such as, for instance but not limited to, the citrus fruits, nuts, berries of various sorts and vines.

In the fruit industry, particularly in connection with drying drupaceous fruit, it has been found in many instances that fruit which has already fallen from the tree because of ripeness is to be preferred over that which has reached a lesser degree of ripeness and has to be picked from the tree or vine prior to sorting. Fruits of the preferred sort frequently are of varying degrees of hardness and when gathered from the ground are usually piled into bins or the like from which they are emptied into suitable supply bins to be alined for supplying to a conveyor mechanism. Under the circumstances, the fruit is frequently soiled and preferably should be washed or because of over-ripeness it is often desirable to add a preservative before it is treated and cut. The mechanism of the present invention is particularly and ideally adapted for such purposes.

The present invention, accordingly, will be found to provide for feeding fruit to a conveyor or the like through a suitable metering system and prior thereto alining the components automatically into single file array as supplied. In a device of this sort the fruit is supplied in random fashion into a fruit feed trough from which it is directed into a suitable guiding channel or other instrumentality to be alined in single file and appropriately fed under a liquid head to the metering component.

In some instances it is desirable to feed the fruit by gravity, for instance, or even by forced feed, from a supply bin into the feed trough. However, the feature of supplying the articles or fruit to be alined is purely a matter of choice rather than a limiting feature of the invention.

In the process of conveying the fruit, after it is supplied to the feed trough, to the metering component, it is desirable to wash and at times add a fruit preservative while the fruit is in the feed trough. Circulating, as well as washing and, if added, preservative liquid is supplied to the fruit feed trough from a jet which feeds the liquid into the feed trough in a direction to initiate a turbulent condition within the liquid contained in the trough. The produced turbulence is sufficient to cause fruit to circulate in a more or less orbital path and in a direction such that the various circulating paths finally extend substantially tangentially with respect to the fruit feed guide. The fruit to be placed in single file alinement is supplied to the fruit feed trough which has its bottom portion generally sloping upwardly toward the point of fruit ejection from the fruit guide. The circulating liquid contained within the trough, accordingly, is at its maximum depth at substantially the region where fruit is supplied to the fruit feed trough and provides a liquid head to move the fruit to the fruit ejection platform. By arranging a fruit feed guide or channel generally along one side of the fruit feed trough and in such a way that the fruit feed guide also slopes progressively upwardly toward the fruit ejection point or platform a suitable head of liquid will exist between the region of fruit supply to the trough and the region of fruit ejection. The liquid level at the region of fruit ejection is usually less than the diameter of the alined fruit fed to the metering device.

In connection with the treatment of drupes, it has been found that fruit of this sort, when immersed in water, generally tends to float in the liquid although it is in a partially submerged state. The circulatory effect in the liquid contained within the trough is sufficient to cause the fruit to be moved along a similar orbital, or even slightly spiral or circulatory path toward the fruit feed guide. The motion of the fruit within the liquid bath is sufficient, in most instances, to wash the fruit and to remove from it dirt and other extraneous matter. In many instances the liquid into which the fruit is placed may be provided with a suitable purifying agent of any desired sort, such as, for instance, an insecticide or the like, because of the fact that in most instances the fruit being handled has been picked up from the ground. In some instances it is also desirable to include in the liquid certain fruit preservatives which can soak into the flesh of the fruit or otherwise penetrate beyond the outer skin.

The fruit feed trough is usually generally triangular in shape and in the form of a right triangle with the fruit feed guide extending along the altitude of the triangle and starting from a point slightly below the level of the sloping trough bottom. This fruit feed guide then extends gradually upwardly to the fruit ejection point or platform. The jet of liquid feeding into the trough to provide the circulatory effect of the fruit therein contained is directed downwardly into the trough along one side from a region near the fruit ejection point. The jet from which the liquid is ejected is so placed that its force is initiated along the hypotenuse of the triangular side of the trough so that fruit floating within the liquid bath circulates by the turbulence introduced by the jet and the circulating effect of the incoming velocity of the liquid so that it follows a path substantially tangential to the trinagle altitude in its orbit of motion. This circulation of the fruit and the circulating effect of the liquid within the trough is sufficient generally to dislodge from a mass of individual pieces of fruit supplied to the trough. The fruit feed guide arranged at one side of the fruit feed trough is made of a depth initially substantially equal to the fruit diameter and of a width likewise approximately equal to the fruit diameter so that the moving drupes from the fruit feed trough are progressed into the guide to line up in the guide in generally single file style. The liquid head effective between the lowermost part of the guide and the ejection point or platform forces the fruit upwardly of the guide to the ejection point whereat a suitable metering mechanism removes individual pieces from the guide and places them upon a suitable form of conveyor.

In the invention provision is likewise made for vibrating at a very slow rate the fruit feed guide with respect to other components. The effect is generally to dislodge by the vibratory motion any pieces of fruit which might adhere to the guide member itself, illustratively, by reason of the fact that broken fruit sections may be included in the supply bin or by reason of the fact that the fruit may tend to jam into the guide. The slight vibration at a relatively slow rate, although slightly higher than the rate at which individual fruits are transported along the guide, causes the desired motion.

With the foregoing features in mind there are included among the objects of the invention those of providing a mechanism whereby fruit from a supply bin of any desired nature may be fed gravitationally or otherwise, into a feed trough from which the fruit may progressively emerge along a guide track to be supplied in single file to a conveyor mechanism. A further object of the invention is to provide mechanism for alining fruit for supply to a conveyor system or the like where the fruit in the process of moving between the supply bin and the alining mechanism shall be cleaned and extraneous particles of dirt or other material removed therefrom. Other objects of the invention are those of providing a fruit alining mechanism of an extremely simple nature, lightweight, compact sort and efficiently operating type may supply fruit to a suitable conveyor.

Other objects of the invention will, of course, become apparent from a reading of the following description and claims in connection with the accompanying drawings of which Fig. 1 is a plan view schematically to illustrate particularly the relationship of the fruit feed trough and guide relative to the conveyor mechanism;

Figure 1:
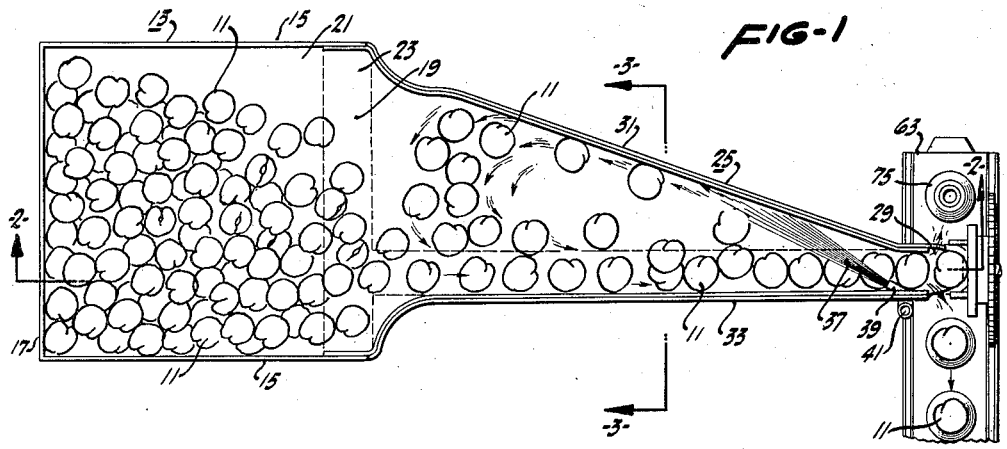
Figure 2:
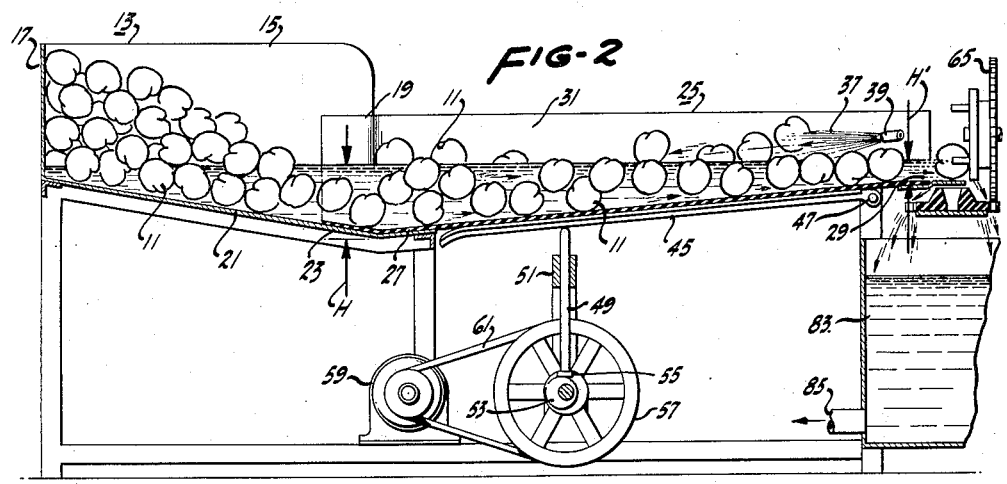
Fig. 2 is an elevation of the structure shown by Fig. 1 taken generally along the section indicated by the line 2—2 of Fig. 1 looking in the direction of the arrows.

Considering now the drawings and referring first to Fig. 1, and illustrating the utility of the invention in its application to drupaceous fruits, such as apricots, peaches or the like conventionally shown at 11, the fruit components, in one form of the device, are adapted to be piled within a supply bin conventionally represented at 13. The supply bin may be of various forms but in its preferred embodiment has upwardly extending planar side members 15 and a rear closure 17. The front portion of the bin, schematically indicated at 19, is open to permit fruit therein contained to slide or move under the effect of gravity along the sloping bottom 21 of the bin to pass into a therewith merging flattened bottom section 23 of a fruit feed trough, collectively designated by the numeral 25. The bottom 21 of the supply bin, as shown by Figs. 1 and 2 particularly, is overlapped by the sloping portion 23 of the trough bottom which then is bent upwardly at 27 to extend along a gradually sloping upward path toward a fruit ejection platform schematically shown at 29.

Except for convenience one may dispense with the supply bin 13 and feed the fruit into the fruit feed trough 25 from a platform, by emptying crates manually into the trough 25 or by a separate conveyor as desired. In such event, it will be apparent that the end of the feed trough 25 shown by Fig. 1 as merging with the supply bin will be closed by an end plate or the like. These have not been shown by the drawing but are alternatives the use of which will readily be appreciated.

The fruit feed trough likewise has its side members 31 and 33 extend upwardly thereof and substantially merge with the side members 15 of the supply bin (or with end plate of the trough where a supply bin is not used). The fittings between the side members of the supply bin and those of the fruit feed trough as well as the bottom elements of each of these components are sufficiently tightly fit together as to be generally liquid-tight. The fit between the sides and bottoms of the supply bin and the fruit feed trough may be secured by suitably welding the components together, if desired, or where it is frequently desired to remove the components from each other, they may be appropriately bolted together with a suitable liquid-tight packing clamped therebetween, although the precise manner of attachment forms no part specifically of the invention.

Figure 3:
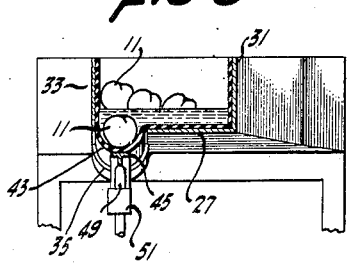
Fig. 3 is likewise a section through the fruit feed trough and the fruit feed guide taken along the line 3—3 of Fig. 1 looking in the direction of the arrows.
Figure 4:
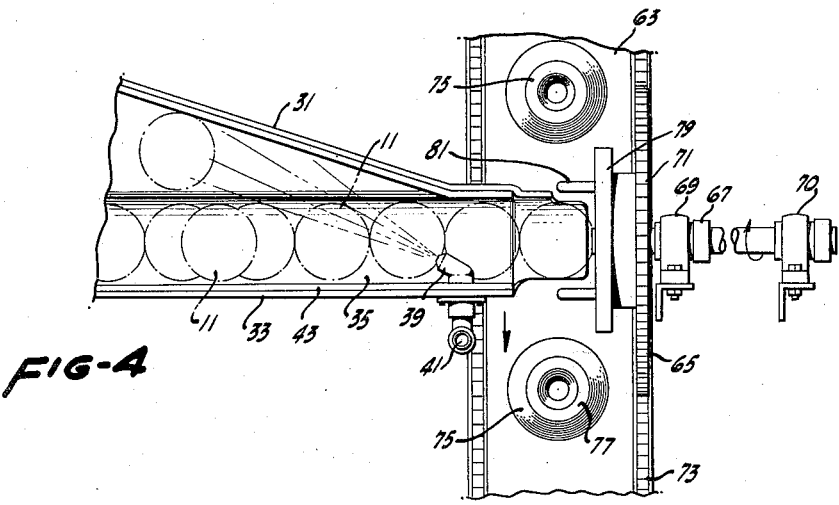
Fig. 4 is an enlarged view of the fruit ejection end of the fruit feed guide showing particularly the liquid jet nozzle and the metering mechanism adapted for removing fruit from the fruit feed guide to a moving conveyor.

Extending along one side of the fruit feed trough, this side illustratively corresponding to the altitude of the triangle formed by the side members 31 and 33 and the assumed base which would be constituted by the region of mergence of the fruit feed trough and the supply bin, there is positioned an appropriate fruit feed guide channel 35 (see particularly Fig. 3). This fruit feed guide channel thus extends along one side of the triangle shape of the fruit feed trough and preferably at its rearmost portion generally corresponds to the junction of the bottom sections 23 and 27. The fruit feed trough 25 itself is usually of a depth only slightly less than the diameter of the fruit which is to be conveyed. The width of the channel, as will later be mentioned, is controllable within limits but for reference purposes and as is indicated particularly by the showings of Fig. 1 and its enlargement in Fig. 4, as well as Fig. 3, of a width substantially corresponding also to fruit diameter.

The upward slope of the lowermost section of the fruit feed channel 35 corresponds generally to that of the sloping bottom 27 of the fruit feed trough and as is apparent from Fig. 3 the bottom of the channel is somewhat below that of the trough bottom 27. In the type of trough which is depicted by the drawings the convergence serves to crowd the fruit toward the point of ejection as the fruit moves within the trough. In order that the fruit within the trough may be moved to follow the circuitous pattern schematically illustrated by the arrows on the various figures of the drawings a jet of liquid—usually water—and indicated schematically by the numeral 37, is ejected from a nozzle schematically represented at 39 to which the fluid, such as water, with or without the addition of insecticides, fruit preservatives and the like, may be supplied from any suitable reservoir, not shown, through an inlet connection or pipe, 41, secured to the wall 33 of the fruit feed trough. As is made particularly apparent from the showing of Fig. 2, the ejected jet 37 of liquid is directed not only in a direction at a low angle with respect to the side wall 31 of the fruit feed trough but also in a direction downwardly. The liquid which is ejected from the nozzle 41 serves first to fill the fruit feed trough 25 and to flow at least part way up the wall of the supply bin 13. When the trough 25 and the supply bin 13 are filled to the indicated level the liquid depth at the plane where the trough and supply bin merge is greater than required to cover individual pieces of fruit fed into the assembly. The fruit then tends to flow or move toward the exit, except as when crowded down by the mass.

When the water or other liquid jet is supplied to the fruit mass two main effects result. The first is that the supplied jet replaces all liquid that is lost over the fruit ejection platform 29 due to the head provided to move the fruit along the feed channel 35. Second, the liquid supply jet introduces into the body of liquid within the trough a turbulent and circulatory effect which is sufficient to circulate the fruit floating in the trough along the pattern generally indicated by the arrows. At the same time the turbulence of the water and the circulation thereof is sufficient to cause the floating fruit to move within the trough to provide a cleaning effect. At the same time, any fruit feeding into the trough from the supply bin is dislodged at the edge of the mass so that individual pieces of the fruit are segregated from the mass as a whole. Accordingly, the liquid jet serves to prevent a jam-up of the fruit and the fruit motion in the trough is according to a pattern such that any fruit which circulates beyond the area where the jet is effective tends to arrive at the fruit ejection platform 29. The feed is slow and the fruit is not damaged. To provide for conditions where the fruit size is varied within wide range the trough, per se, may be restricted to various sizes. This size variance is controlled by providing liner elements 43 within the trough 35 which are of various sizes and which may be in the nature of flexible components held within and rested upon the lower surface of the channel.

Generally speaking, the liner 43 is in the nature of a semi-tubular component of rubber, fabric or other flexible material which is subject to positional change and distortion under applied force. Generally speaking, in the case where apricots are chosen as the type of fruit used, any one size channel can take care of a reasonable size variance in fruit and for normal operations the size gradations of the fruit supplied to the supply bin is sufficiently uniform to permit any particular size of channel to be used. However, where there are from day to day or from hour to hour fruits of different sizes supplied, then, either a thicker liner or a liner extending for a lesser depth into the channel may be supplied.

In the alternative, the channel may consist of tubular elements extending internally of the recessed groove formed along the edge of the fruit feed trough, the tubular elements being small and permitting sliding or even rolling contact at two or more points between the fruit and the tube to support the fruit as it is moved under the head of liquid indicated by the heights H and H' (see Fig. 2) between the arrows at the rear of the trough and at the ejection end. Adjustment, then, may be provided for the spacing of the tubular members relative to each other and permitting an adjustment of them in such a way that they are spread apart or closed together, depending upon the fruit size.

In this connection the fruit as it is brought into the fruit feed trough 43 is, as above noted, moving due to motion imparted in the bath within the trough. Therefore, under the liquid head the fruit can progressively move slowly up the incline towards the fruit ejection platform 29. Because of the chosen width of the trough only a single piece of fruit can occupy the transfer section at the same time so the individual pieces of fruit aline themselves in single file fashion for movement toward the fruit ejection platform.

In some instances, primarily because of broken pieces of fruit the inside of which may be sticky in nature, and which tends to adhere to the walls of the fruit feed trough 43, it is desirable slightly to vibrate or agitate the bottom of the trough in order to provide dislodgement of such components from the trough walls or bottoms. To this end there is provided an elongated flattened strip 45 which is hinged at 47 to the lower surface of the recessed trough 35. The flat strip 45 may be caused to press upon the lower surface of the flexible liner element 43 to an extent sufficient to deform it. As a general rule the movement of the flat strip 45 about the point 47 as a pivot or hinge may be provided by a loosely supported drive rod 49 anchored within a bearing 51 and arranged to be moved up and down by means of an eccentric 53 and follower 55 connected to the end of the drive rod and resting upon the eccentric. Purely as a matter of convenience of illustration, the eccentric is driven from a flywheel 57 which, in turn, is driven from the conventionally represented drive motor 59 by means of a belt drive 61, although it is to be understood this is purely illustrative.

Generally speaking, at the deepest end of the fruit feed guide channel the movement of the drive rod up and down by a distance of the order of 3/16" is usually adequate to accomplish the purpose of gently dislodging fruit and causing any jammed fruit to move. The vibrational frequency may be varied within relatively wide limits although it has been found upon experimentation that if, for instance, the apparatus is designed to feed the fruit at, say, 200 units per minute, the vibrational frequency of the flattened strip 45 may be of the order of 300 vibrations per minute, purely as an illustration.

With the fruits thus moving in the direction of the arrows along the fruit feed channel toward the fruit ejection platform 29 it is important that provision be made for dislodging the fruit from the platform at regular time intervals. To this end and assuming that the fruit is to be conveyed to appropriate utilization points and appropriate utilization apparatus by means of a conveyor belt 63, the belt may be assumed to be driven by a drive gear or pinion 65 through an appropriate drive shaft 67 held in bearings 69, 70 from a suitable source (not shown). The drive gear or pinion 65 is preferably provided with teeth 71 about its periphery, which teeth are adapted to mesh with the link openings 73 in a drive chain mechanism secured at opposite sides of the conveyor belt 63. Thus, with rotation of the drive pinion 71 a drive is provided to move the conveyor belt in the direction shown by the arrow.

Figure 5:
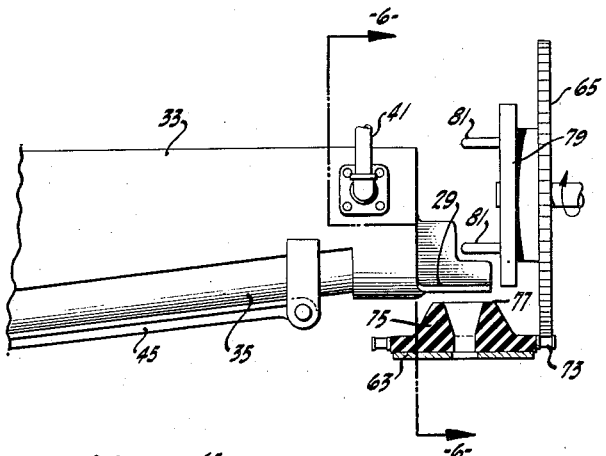
Fig. 5 is a side elevation view of the showing of Fig. 4.
Figure 6:
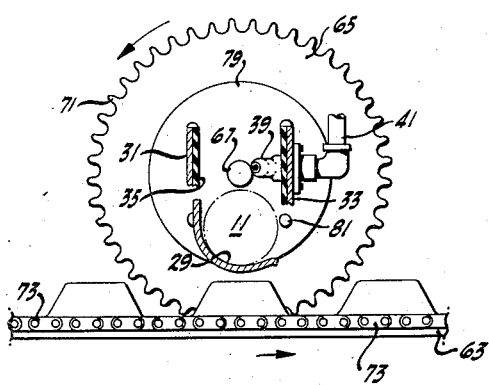
Fig. 6 is a view taken along the line 6—6 of Fig. 5 particularly to show the relationship of the metering mechanism relative to the conveyor mechanism to provide for dislodgment of the fruit from the fruit feed guide to the conveyor.

The conveyor belt 63 has regularly spaced thereon suitable fruit receiving cups 75 having ring-like circular ridges at the top into which the fruit is adapted to seat when removed from the fruit ejection platform. The fruit as it is fed from the fruit feed channel to the fruit ejection platform 29 rests on the platform until removed by an appropriate form of metering mechanism 79. The illustrated metering mechanism in the form shown is a disc having pins 81 extending outwardly therefrom. The pins 81 pass above the platform 29 during the rotation of the metering mechanism at a height approximately at the middle of the average size fruit adapted to be fed to the fruit ejection platform. With appropriate relationship in the spacing of the pins 81 about the periphery of the disc of the metering mechanism 79 the same drive mechanism which moves the conveyor belt 63 serves by means of pins 81 to remove one piece of fruit 11 from the fruit ejection platform each time one of the fruit receiving cups 75 passes therebeneath (see, for instance, Figs. 5 and 6 particularly) and the fruit then is rested in the ring-like circular ridges 77 of the fruit receiving cups 75 to be carried along the belt for utilization. At this point there is no effort to orient the fruit with respect to the plane of the pit in its relationship to the belt which, if provided, is taken care of at later points in the operation.

The overflow of liquid from the end of the fruit ejection platform adjacent to the belt is taken care of by a liquid receiving reservoir 83 arranged immediately beneath the belt and from which reservoir a suitable outlet tube 85 is provided to connect to either a drain source or a suitable pump for withdrawing or recirculating the liquid. The fruit when placed upon the feed belt 63 then is moved as shown by the arrows for any desired utilization purposes.

Various modifications, of course, may be made to the apparatus herein shown although it has been found that the apparatus herein described and depicted is particularly satisfactory for the operation desired.

Having now described the invention what is claimed is:

1. Mechanism for alining objects to be supplied to a conveyor system comprising a feed trough adapted to contain objects to be placed in alinement, the said trough having an elongated feed guide extending lengthwise thereof to a point whereat the objects are ejected, the bottom of the guide progressively and uniformly sloping gradually upwardly toward the ejection point, the sides of the guide being spaced by a distance only adequate to permit objects located therein to aline themselves in single file, said trough being adapted to be filled with liquid varying from a minimum level at the point of object ejection to a maximum level in substantially the region of the trough in which the major portion of the objects are to be placed and in which the guide is connected to provide a liquid head within the trough and the object-feed guide tending to move the objects along the guide toward the ejection end, means for circulating the liquid within the trough in a region inwardly of the object ejection end to cause propagation of the therein contained objects in a circulating orbital path toward and in the direction of the ejection end of the guide and to move the liquid at sufficient velocity to separate individual objects of those contained within the trough along the circulating path toward the ejection guide.

2. The mechanism claimed in claim 1 comprising, in addition, metering means for controlling and timing the rate of object removal from the object-feed guide.

3. Mechanism for alining objects to be supplied to a conveyor system comprising a feed trough being adapted to contain the objects, an elongated feed guide extending lengthwise thereof to a point of object ejection, the bottom of the guide progressively and uniformly sloping gradually upwardly toward the ejection point at which the depth is less than the diameter of the supplied objects, the sides of the guide being spaced by a distance only adequate to permit objects located therein to aline themselves in single file, said trough being adapted to be filled with liquid to a level above that of object ejection to provide a liquid head within the trough and the feed guide tending to move the objects along the guide toward the ejection end, means for producing turbulence within the liquid within the trough in a region inwardly of the ejection end to circulate objects within the trough in a generally orbital path and to break up any massing of objects contained within the trough and to move such objects in random fashion toward the ejection guide.

4. The mechanism claimed in claim 3 comprising, in addition, metering means for controlling the removal of objects from the ejection end of the feed guide.

5. Mechanism for alining fruit to be supplied to a conveyor system comprising a fruit-feed trough adapted to contain fruit to be placed in alinement, an elongated fruit-feed guide extending lengthwise of the trough to a point of fruit ejection, the bottom of the guide progressively and uniformly sloping gradually upwardly toward the fruit ejection point, the sides of the guide being spaced by a distance only adequate to permit fruit located therein to aline itself in single file, said trough and supply bin being adapted to be filled with liquid varying from a minimum level at fruit ejection point to a maximum level inwardly thereof, to provide a liquid head within the trough and the fruit-feed guide tending to move the fruit along the fruit-feed guide toward the ejection end, means for circulating the liquid within the trough in a region inwardly of the fruit ejection end to cause propagation of the therein contained fruit in a generally orbital path toward the fruit ejection end of the guide and to move the liquid at sufficient velocity to prevent individual fruits in the trough from massing and to move the same within the trough along the circulating path toward the ejection guide.

6. The mechanism claimed in claim 5 comprising, in addition, metering means for controlling the removal of fruit from the ejection end of the fruit-feed guide.

7. Mechanism for alining fruit to be supplied to a conveyor system comprising a fruit-feed trough having a recessed elongated fruit-feed channel extending lengthwise thereof to a point of fruit ejection, the bottom channel progressively and uniformly sloping gradually upwardly toward the fruit ejection point at which the channel depth is less than the diameter of the supplied fruit, the channel walls being spaced by a distance only adequate to permit the fruit to aline therein in single file, said trough being adapted to be filled with liquid to the level above that of fruit ejection to provide a liquid head within the fruit-feed channel tending to move fruit therein longitudinally of the channel toward its ejection end, means for producing turbulence within the liquid held in the trough in a region inwardly of the fruit ejection end to circulate fruit within the trough in a generally orbital path toward the channel and to break up any fruit massing of the supply and to move the fruit within the trough in random fashion toward the ejection channel.

8. Mechanism for alining fruit to be supplied to a conveyor system comprising a fruit-feed trough having a recessed elongated fruit-feed channel extending lengthwise thereof to a point of fruit ejection, the channel bottom progressively and uniformly sloping gradually upwardly toward the fruit ejection point at which the channel depth is less than the diameter of the supplied fruit, the channel walls being spaced by a distance only adequate to permit the fruit to aline therein in single file, means to supply fruit into the trough, said trough and channel being adapted to be filled with liquid to the level above that of the plane of fruit ejection to provide a liquid head within the fruit-feed channel tending to move fruit therein longitudinally of the channel toward the ejection end, means for producing turbulence within the liquid held in the trough in a region inwardly of the fruit ejection end to circulate fruit supplied to the trough along a generally orbital path toward the channel and to break up the fruit mass of the supply and move the fruit within the trough in random fashion toward the ejection channel.

9. Mechanism for alining fruit to be supplied to a conveyor system comprising a fruit-feed trough having a recessed elongated fruit-feed channel extending lengthwise thereof to a point of fruit ejection, the bottoms of each of the trough and associated channel progressively and uniformly sloping gradually upwardly toward the fruit ejection point at which the channel depth is less than the diameter of the supplied fruit, the channel walls being spaced by a distance only adequate to permit the fruit to aline therein in single file, a fruit supply bin connected in communicating fashion with the trough for feeding fruit from the stockpile of the supply bin into the trough, said trough and channel and the communicating supply bin being adapted to be filled with liquid to a level above that of fruit ejection to provide a liquid head within the fruit-feed channel tending to move fruit therein longitudinally of the channel toward the ejection end, means for producing turbulence within the liquid held in the trough in a region inwardly of the fruit ejection end to circulate fruit contained within the trough in a generally orbital path toward the channel and to break up the fruit mass of the supply and move the fruit within the trough in random fashion toward the ejection channel.

10. Mechanism for alining fruit to be supplied to a conveyor system comprising a fruit-feed trough, a recessed elongated fruit-feed channel extending lengthwise of the trough and along one side thereof to a point of fruit ejection, the bottom of the channel sloping progressively and uniformly gradually upwardly toward the fruit ejection point at which the channel depth is less than the diameter of the supplied fruit, the channel sides being spaced by a distance only adequate to permit the fruit to be alined therein in single file, a fruit supply bin connected and communicating with the trough for gravitationally feeding fruit from the stockpile of the supply bin into the trough, said trough and communicating supply bin being adapted to be filled with water to at least the level above that of the plane of fruit ejection to provide a water head within the trough and the fruit-feed channel tending to move the fruit along the fruit-feed channel toward the ejection end, means for producing turbulence within the trough in a region inwardly of the ejection end to circulate fruit within the trough in generally orbital patterns and to break up the fruit mass of the gravitationally fed supply and move fruit within the trough in random fashion toward the ejection channel.

11. Mechanism for alining fruit to be discharged to a conveyor system comprising a fruit-feed trough of generally right-triangle shape having a recessed elongated fruit-feed channel of substantially U-shaped cross-section extending lengthwise generally along the triangle altitude to a point of fruit ejection located substantially at the triangle apex, the bottom of the channel progressively and uniformly sloping gradually upwardly toward the fruit ejection point at which the channel depth is less than the diameter of the supplied fruit, the channel sides being by a distance only adequate to permit the fruit to aline therein in single file, a fruit supply bin connected and communicating with the trough along its bottom surface and adapted for feeding fruit therein contained by gravity from a stockpile of the supply bin into the trough, said trough and communicating supply bin being adapted to be filled with water to at least the level of fruit ejection to provide a water head within the trough and the fruit-feed channel measured by the water depth at the point of maximum channel depth below the fruit ejection point, which water head tends to move any fruit within the fruit-feed channel toward the ejection end, a high velocity water jet adapted to be directed into the trough inwardly from the triangle apex and generally parallel to the triangle hypotenuse and adapted for producing a circulation of the water within the trough initiated in a region inwardly of the ejection end and moving generally orbitally to circulate fruit within the trough and to segregate individual fruit pieces from the gravitationally fed supply and move fruit within the trough in paths leading toward the ejection channel.

12. Mechanism for alining fruit to be discharged to a conveyor system comprising a fruit-feed trough of generally right-triangle shape, a recessed elongated fruit-feed channel of substantially U-shaped cross-section extending lengthwise generally along the triangle altitude to a point of fruit ejection, the channel bottom progressively and uniformly sloping gradually upwardly toward a fruit ejection point at the triangle apex at which the channel depth is less than the diameter of the supplied fruit, the channel walls being spaced by a distance only adequate to permit the fruit to aline therein in single file, said trough and channel being adapted to be filled with water to a level above that of the plane of fruit ejection to provide a water head within the trough and the fruit-feed channel measured by the water depth at the point of maximum channel depth below the fruit ejection point, which water head tends to move any fruit within the fruit-feed channel toward the ejection end, a high velocity water jet adapted to be directed into the trough inwardly from the triangle apex and generally parallel to the triangle hypotenuse for producing a circulation of the water within the trough intitiated in a region inwardly of the ejection end moving generally orbitally to circulate fruit within the trough and move fruit within the trough in paths leading toward the ejection channel.

13. A fruit alining mechanism to supply fruit in single file to a conveyor system comprising a generally triangularly-shaped feed trough having a planar bottom surface and upwardly extending sides, said trough having a recessed U-shaped channel section extending generally parallel to one side thereof with one side wall of the channel merging into the flattened bottom section, the side spacing of the channel walls being only adequate to permit fruit to aline therein in single file, a fruit supply bin connected with the trough and adapted to feed fruit thereto gravitationally, means to support the trough and the supply bin in juxtaposition with the bottom of the trough sloping upwardly so that liquid introduced into concavity formed by juxtaposed trough and supply bin flows over the ejection point at one end of the channel and extends at the other end of the channel determined by merging plane of the trough and supply bin to a depth appreciably greater than the greatest dimension of the fruit to provide a liquid head within the channel tending to move fruit therein contained along the channel to the fruit ejection point, a nozzle mechanism adapted for introducing a liquid jet within the trough tending to circulate any therein contained liquid in a generally whirling pattern and in paths to move fruit adapted to be contained within the trough toward the recessed channel and likewise to break up fruit masses of the gravitationally fed supply, means to vibrate the channel bottom with respect to the fruit-holding trough to dislodge fruit tending to adhere to the channel and thereby to permit the liquid head to move and rotate the fruit in the direction of the ejection point, and a metering mechanism positioned adjacent to the fruit ejection point for removing the fruit moved to the ejection point.

14. The combination claimed in claim 13 comprising, in addition, means to direct a liquid jet within the trough to replace liquid lost due to overflow at the fruit ejection point and to initiate the turbulent state within the trough and at the edge of the stockpile, whereby the fruit contained within the trough is rotated generally in the direction of the channel, said jet being located at a point inwardly from the end of the channel which is remote from the merging regions of the trough and supply bin.

15. The mechanism claimed in claim 14 wherein the channel is provided with a resilient bottom and eccentric means for vibrating the resilient bottom.

16. Mechanism for alining objects to be discharged to a conveyor, comprising an object-feed trough of generally right-triangle shape having an object-feed channel of recessed cross-section extending lengthwise generally along the triangle altitude to an object ejection point, the channel bottom progressively and uniformly sloping gradually upwardly toward the ejection point at approximately the triangle apex at which the channel depth is less than the cross-section of the objects to be alined, the channel walls being spaced by a distance only adequate to permit the objects to aline therein in single file, said trough and channel being adapted to be filled with liquid to a level above that of the plane of object ejection to provide a liquid head within the trough and the feed channel measured by the liquid depth at the point of maximum channel depth below the ejection point, which liquid head tends to move objects within the channel toward the ejection end, means for directing a high velocity liquid jet into the trough inwardly from the region of the triangle apex and generally parallel to the triangle hypotenuse for initiating circulation of the trough-held liquid inwardly of the object ejection end with the circulating path moving generally orbitally to circulate objects within the trough in generally random fashion toward the ejection channel, and means to introduce vibrational effects upon the ejection channel to dislodge any objects tending to adhere thereto to permit the liquid head to transport the objects toward the ejection point.

References Cited in the file of this patent

UNITED STATES PATENTS

| | | |
|---|---|---|
| 1,451,450 | Smith | Apr. 10, 1923 |
| 1,744,363 | Chapman | Jan. 21, 1930 |

U. S. DEPARTMENT OF COMMERCE
PATENT OFFICE
CERTIFICATE OF CORRECTION

Patent No. 2,824,665                 February 25, 1958

Lloyd H. Lamouria

It is hereby certified that error appears in the printed specification of the above numbered patent requiring correction and that the said Letters Patent should read as corrected below.

Column 9, line 16, after "being" insert --spaced--.

Signed and sealed this 22nd day of April 1958.

(SEAL)
Attest:
KARL H. AXLINE
Attesting Officer

ROBERT C. WATSON
Commissioner of Patents